(12) United States Patent
Kojima

(10) Patent No.: US 10,725,294 B2
(45) Date of Patent: Jul. 28, 2020

(54) VIRTUAL IMAGE DISPLAY DEVICE

(71) Applicant: JVC KENWOOD Corporation, Yokohama-shi, Kanagawa (JP)

(72) Inventor: Daisuke Kojima, Yokohama (JP)

(73) Assignee: JVC KENWOOD CORPORATION, Yokohama-Shi (JP)

( * ) Notice: Subject to any disclaimer, the term of this patent is extended or adjusted under 35 U.S.C. 154(b) by 0 days.

(21) Appl. No.: 16/429,323

(22) Filed: Jun. 3, 2019

(65) Prior Publication Data
US 2019/0285888 A1    Sep. 19, 2019

Related U.S. Application Data

(63) Continuation of application No. PCT/JP2018/010719, filed on Mar. 19, 2018.

(30) Foreign Application Priority Data

Jul. 11, 2017  (JP) ................. 2017-135224

(51) Int. Cl.
| | |
|---|---|
| *G02B 5/08* | (2006.01) |
| *G02B 27/01* | (2006.01) |
| *B60K 35/00* | (2006.01) |
| *G03B 21/20* | (2006.01) |

(52) U.S. Cl.
CPC .......... *G02B 27/0101* (2013.01); *B60K 35/00* (2013.01); *G02B 5/08* (2013.01); *G02B 27/01* (2013.01); *G03B 21/2066* (2013.01); *B60K 2370/334* (2019.05)

(58) Field of Classification Search
CPC .... B60K 35/00; B60K 2370/334; G02B 5/08; G02B 21/2066; G02B 27/0101
USPC ......................................................... 345/419
See application file for complete search history.

(56) References Cited

U.S. PATENT DOCUMENTS

| | | | | |
|---|---|---|---|---|
| 4,787,711 | A | * 11/1988 | Suzuki | G02B 27/0101 359/631 |
| 2017/0285338 | A1 | * 10/2017 | Narushima | B60K 35/00 |

FOREIGN PATENT DOCUMENTS

| | | |
|---|---|---|
| EP | 3543767 A1 | 9/2019 |
| GB | 2458898 A | 10/2009 |
| JP | S62225429 A | 10/1987 |

* cited by examiner

*Primary Examiner* — Jacinta M Crawford

(74) *Attorney, Agent, or Firm* — Brundidge & Stanger, P.C.

(57) ABSTRACT

A virtual image display device includes: a display unit that generates an image display light by modulating an illumination light; and a projection optical system that includes at least a concave mirror for reflecting the image display light toward a virtual image presentation plate. The display unit is provided at a position nearer a focal point within a meridional plane of a composite optical system formed by the virtual image presentation plate and the projection optical system than a focal point within a sagittal plane of the composite optical system.

5 Claims, 2 Drawing Sheets

VIRTUAL IMAGE DISPLAY DEVICE

CROSS REFERENCE TO RELATED APPLICATION

Priority is claimed to Japanese Patent Application No. 2017-135224, filed on Jul. 11, 2017, the entire content of which is incorporated herein by reference.

BACKGROUND

1. Field of the Invention

The present invention relates to a virtual image display device.

2. Description of the Related Art

Recently, head-up displays are available for use as display devices for vehicles. A head-up display projects an image display light toward, for example, a windshield of a vehicle, superimposes a virtual image based on the image display light on the scenery outside the vehicle, and displays the resultant image. A windshield has two interfaces inside and outside the vehicle. The image display lights reflected at the respective interfaces and visually perceived may be superimposed with a shift and viewed as double images. To inhibit double images from being produced, there is proposed a mathematical expression for defining a viewing distance to contain the amount of shift between double images within the resolution of the human eyes and obtaining an optical arrangement that realizes the viewing distance.

The technology described above requires a large viewing distance to the position of presentation of a virtual image ahead of the user in order to reduce double images. It is preferred to reduce the occurrence of double images suitably, regardless of the viewing distance to a virtual image.

SUMMARY

The embodiments address the above-described issue, and a general purpose thereof is to provide a technology for improving the visibility of a virtual image presented.

A virtual image display device according to an embodiment includes: a display unit that generates an image display light by modulating an illumination light; and a projection optical system that includes at least a concave mirror for reflecting the image display light toward a virtual image presentation plate. The display unit is provided at a position nearer a focal point within a meridional plane of a composite optical system formed by the virtual image presentation plate and the projection optical system than a focal point within a sagittal plane of the composite optical system.

Optional combinations of the aforementioned constituting elements, and implementations of the invention in the form of methods, apparatuses, and systems may also be practiced as additional modes of the present invention.

BRIEF DESCRIPTION OF THE DRAWINGS

Embodiments will now be described by way of examples only, with reference to the accompanying drawings which are meant to be exemplary, not limiting and wherein like elements are numbered alike in several Figures in which.

DETAILED DESCRIPTION

The invention will now be described by reference to the preferred embodiments. This does not intend to limit the scope of the present invention, but to exemplify the invention.

A description will be given of embodiments of the present invention with reference to the drawings. Specific numerical values are shown in the embodiments by way of example only to facilitate the understanding of the invention and should not be construed as limiting the scope of the invention unless specifically indicated as such. Those elements in the specification and drawings that have substantially identical functions and structures are represented by the same reference symbols so that the description is not duplicated. Elements not directly relevant to the invention directly are omitted from the illustration.

Figure 1:
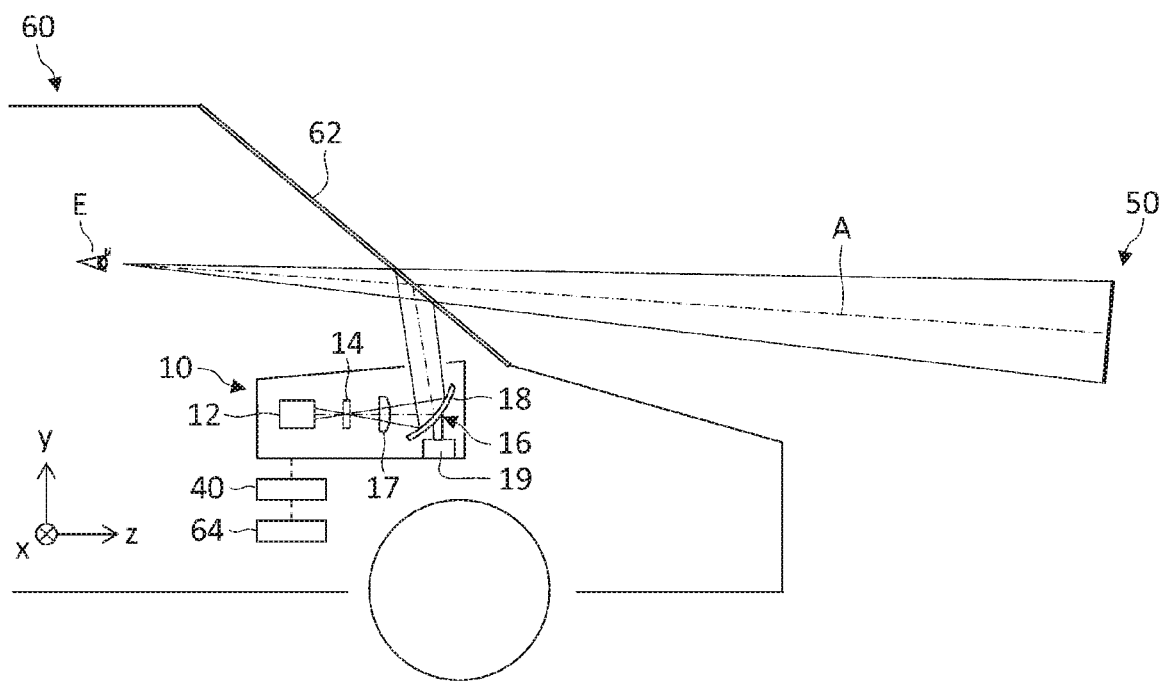
FIG. 1 schematically shows a configuration of a virtual image display device according to the embodiment.

FIG. 1 schematically shows how a virtual image display device 10 according to the embodiment is installed. In this embodiment, the virtual image display device 10 is installed in a dashboard of a vehicle 60, which exemplifies a moving object. The virtual image display device 10 is a so-called head-up display device. The virtual image display device 10 presents a virtual image 50 in front of the vehicle 60 in the direction of travel (rightward direction in FIG. 1) by projecting an image display light toward a windshield 62, which is a virtual image presentation plate. The user E (e.g., the driver) can see the virtual image 50 superimposed on the actual scenery via the windshield 62. Therefore, the driver E can access information shown in the virtual image 50 substantially without moving the line of sight while driving the vehicle. Referring to the FIG. 1, the direction of travel of the vehicle 60 (longitudinal direction) is defined as the z direction, the vertical direction of the vehicle 60 (up/down direction) is defined as the y direction, and the transversal direction of the vehicle 60 is defined as the x direction.

The virtual image display device 10 includes an illumination unit 12, a display unit 14, a projection optical system 16, and a control unit 40. The illumination unit 12 is a light source for generating a display light and generates an illumination light for illuminating the display unit 14. The illumination unit 12 includes a light emitting device such as a light emitting diode (LED) and a laser diode (LD), and an optical device for adjusting the light intensity distribution and angle distribution of the light output from the light emitting device. The configuration of the illumination unit 12 is not limited to any particular type. For example, a light emitting device such as a light tunnel, a Fresnel lens, and a light diffusion plate may be used to condition the output light from the light emitting device.

The display unit 14 modulates an illumination light from the illumination unit 12 to generate a display light and forms an intermediate image corresponding to the display content of the virtual image 50. The display unit 14 includes an image display device of transmission type for generating a display light. For example, the display unit 14 includes a display device such as a liquid crystal panel of transmission type. The image display device receives an image signal transmitted from the control unit 40 and generates an image display light for the display content corresponding to the image signal. The display unit 14 may further include an optical device for conditioning the orientation and light distribution angle of the image display light. For example, the display unit 14 may include a screen of transmission type such as a microlens array sheet and a light scattering sheet.

The projection optical system 16 projects the image display light generated by the display unit 14 toward the windshield 62. The projection optical system 16 includes a convex lens 17 and a concave mirror 18. The concave mirror 18 reflects the image display light from the display unit 14 toward the windshield 62 to enlarge the intermediate image displayed on the display unit 14 for presentation to the user E. The convex lens 17 is provided between the display unit 14 and the concave mirror 18 and changes the direction of the image display light directed from the display unit 14 toward the concave mirror 18.

The projection optical system 16 may further include an additional optical device (not shown). For example, a planar mirror for folding the light path from the illumination unit 12 to the concave mirror 18 multiple times may be provided. The additional planar mirror may be provided between the illumination unit 12 and the display unit 14 or provided between the display unit 14 and the convex lens 17 or provided between the convex lens 17 and the concave mirror 18. Two or more planar mirrors may be provided in the projection optical system 16. Further, the convex lens 17 may be formed by a lens group comprised of a plurality of lenses.

The control unit 40 operates the illumination unit 12 and the display unit 14 to generate an image for display and present the virtual image 50 corresponding to the image for display. The control unit 40 is connected to an external device 64 and generates the image for display based on the information from the external device 64.

The external device 64 is a device for generating original data for an image displayed as the virtual image 50. For example, the external device 64 may be an Electronic Control Unit (ECU) for the vehicle 60, a navigation device, or a mobile device such as a cell phone, smartphone, tablet, etc. The external device 64 transmits, to the control unit 40, image data necessary to display the virtual image 50, information indicating the content and type of the image data, and information related to the vehicle 60 such as the speed and current position of the vehicle 60.

In this embodiment, the image display lights reflected at the two interfaces inside and outside the vehicle and visually perceived are prevented from being displayed with a shift and viewed as double images, by providing the display unit 14 at a predetermined position. Before describing the arrangement of the display unit 14 according to the embodiment in detail, a description will be given of the occurrence of double images with reference to a comparative example.

Figure 2:
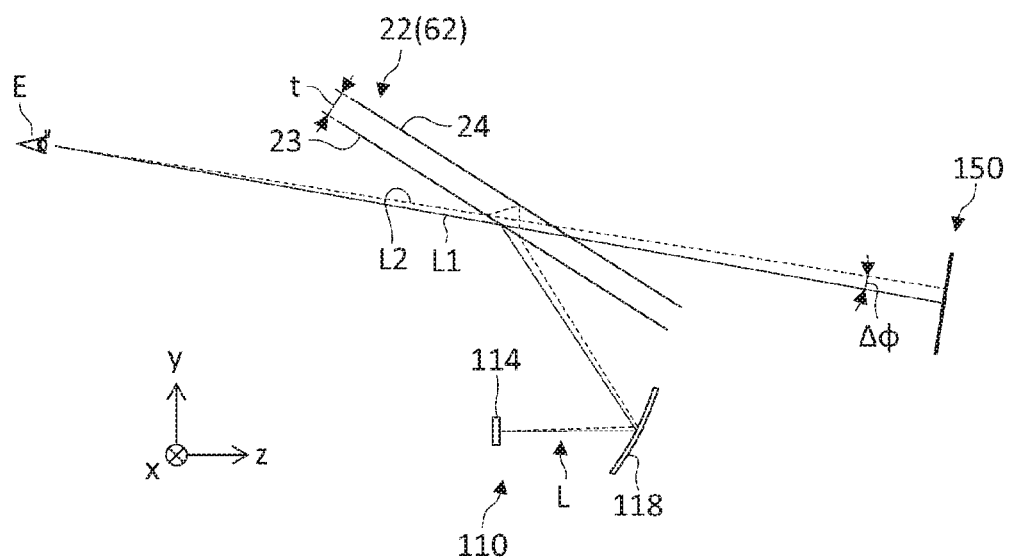
FIG. 2 shows an optical arrangement in the virtual image display device according to the comparative example.

FIG. 2 shows an optical arrangement in a virtual image display device 110 according to the comparative example and schematically shows that double images are produced. The virtual image display device 110 is provided with a display unit 114 and a concave mirror 118 configured in a manner similar to that of the embodiment described above. The concave mirror 118 reflects the image display light from the display unit 114 toward a virtual image presentation plate 22 embodied by the windshield 62. The virtual image presentation plate 22 has a predetermined thickness t and has a first principal surface 23 and a second principal surface 24. The first principal surface 23 corresponds to the interface of the windshield 62 inside the vehicle, and the second principal surface 24 corresponds to the interface of the windshield 62 outside the vehicle.

The image display light arriving at the user E from an arbitrary point E of the display unit 114 mainly passes through two light paths L1, L2. The first light path L1 is a light path in which the light is reflected by the first principal surface 23 and travels toward the user E. The second light path L2 is a light path in which the light is refracted by the first principal surface 23, reflected by the second principal surface 24, and then re-refracted by the first principal surface 23 and travels toward the user E. If there is an angular difference $\Delta\varphi$ between the first light path L1 and the second light path L2 leading toward the user E, the image display lights traveling on the two light paths L1, L2 are visually perceived as being shifted from each other according to the angular difference $\Delta\varphi$, producing double images in the virtual image 150. While it is possible to postulate a light path in which the light is reflected by multiple times between the first principal surface 23 and the second principal surface 24 and travels toward the user E, the component of the image display light reflected multiple times and traveling toward the user E is small and can be neglected in a normal mode of usage.

Figure 3:
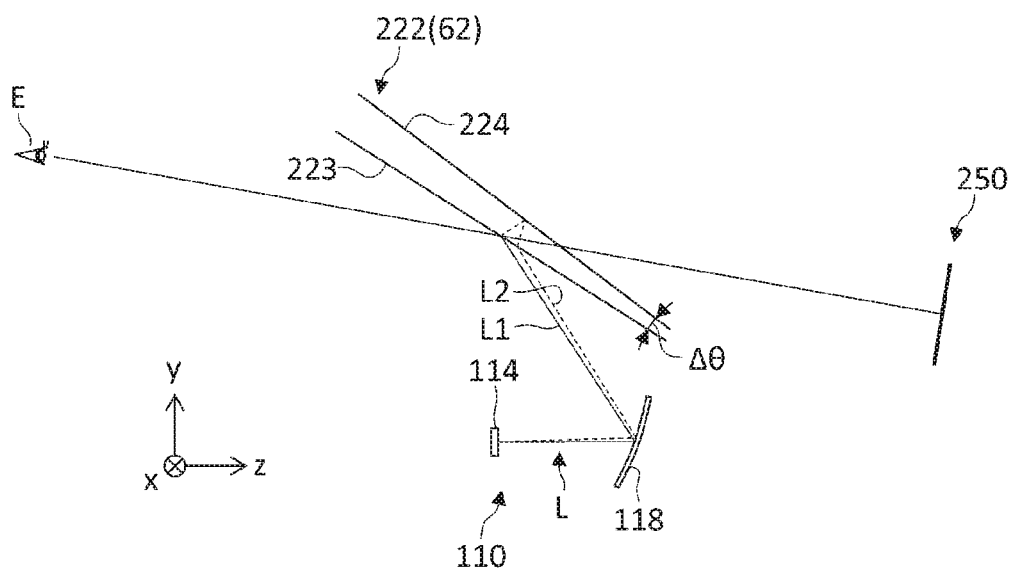
FIG. 3 shows an optical arrangement in the virtual image display device according to the comparative example.

FIG. 3 shows an optical arrangement in the virtual image display device 110 according to the comparative example and schematically shows how double images are inhibited by using a virtual image presentation plate 22 different from that of FIG. 2. The virtual image presentation plate 222 shown in FIG. 3 is a so-called "wedge glass" and is configured such that the thickness of the virtual image presentation plate 222 varies. This results in a first principal surface 223 and a second principal surface 224 of the virtual image presentation plate 222 having mutually different angles of inclination relative to the virtual image display device 110, and an angular difference $\Delta\theta$ is provided between the surfaces. By using a wedge glass in which an angular difference $\Delta\theta$ is provided between the two principal surfaces 223, 224, the angular difference $\Delta\varphi$ between the first light path L1 and the second light path L2 is corrected, making it possible to present a virtual image 250 in which double images are moderated.

However, a "wedge glass" like this need be formed by controlling the angular difference $\Delta\theta$ with high precision and so is more expensive than an ordinary glass having a uniform thickness t. Further, forming the windshield 62 of the vehicle 60 by using a wedge glass not only requires a dedicated wedge glass adapted to the shape of the vehicle 60 but also requires replacing the entirety of the windshield 62 so that a heavy cost will be incurred. It is therefore preferred to reduce the occurrence of double images without using a special wedge glass.

Figure 4:
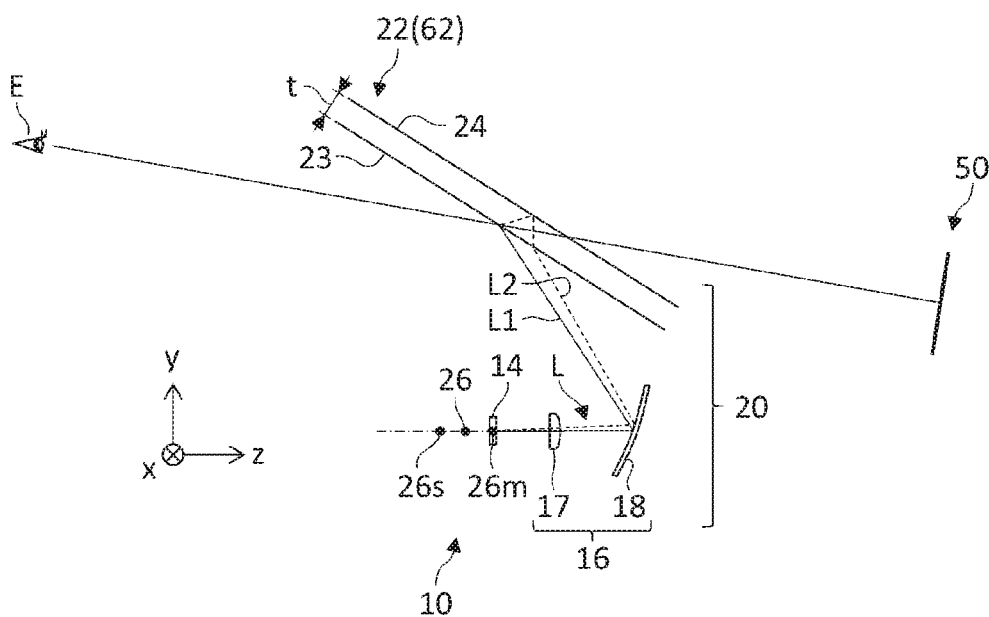
FIG. 4 shows an optical arrangement in the virtual image display device according to the embodiment in detail.

FIG. 4 shows an optical arrangement in the virtual image display device 10 according to the embodiment in detail and corresponds to the configuration of FIG. 1. In FIG. 4, an ordinary glass having a uniform thickness t is used as the virtual image presentation plate 22 instead of a wedge glass. According to the embodiment, the occurrence of double images is inhibited by inserting a convex lens 17 between the display unit 14 and the concave mirror 18. In particular, the occurrence of double images is inhibited by providing the display unit 14 at a focal point 26m within the meridional plane of a composite optical system 20 formed by the projection optical system 16 and the virtual image presentation plate 22.

The term "meridional plane" refers to a plane that includes the light axis of the composite optical system 20 and the principal ray of the image display light L. In the example shown in FIG. 4, the yz plane represents the meridional plane. The angular difference between the first light path L1 and the second light path L2 is produced within the meridional plane. Therefore, arranging the display unit 14 at the focal point 26m within the meridional plane of the composite optical system 20 aligns the orientations of the two light paths L1, L2 leading to the user E and inhibits the occurrence of double images.

In the composite optical system 20, the image display light L is diagonally incident on the concave mirror 18 and the virtual image presentation plate 22 so that astigmatism is produced. In other words, the focal point 26m within the meridional plane of the composite optical system 20 is at a position different from that of a focal point 26s within the sagittal plane. The focal point 26m within the meridional plane is located nearer the convex lens 17 than the focal point 26s within the sagittal plane. The term "sagittal plane" refers to a plane that includes the light axis of the composite optical system 20 and is a plane perpendicular to the meridional plane. A composite focal point 26 of the composite optical system 20 is located between the focal point 26m within the meridional plane and the focal point 26s within the sagittal plane.

The focal point of the composite optical system 20 is determined by the characteristics and arrangement of the convex lens 17, the concave mirror 18, and the virtual image presentation plate 22 forming the composite optical system 20. More specifically, the focal point of the composite optical system 20 is determined by the focal distance of the convex lens 17, the focal distance of the concave mirror 18, the focal distance of the virtual image presentation plate 22, and the relative distances and orientations of the convex lens 17, the concave mirror 18, and the virtual image presentation plate 22. The virtual image presentation plate 22 may have a predetermined curvature. The first principal surface 23 may be concave in shape, and the second principal surface may be convex in shape. Alternatively, the first principal surface 23 and the second principal surface 24 may be flat in shape. The positions of the focal points 26, 26m, and 26s of the composite optical system 20 are shown only schematically in FIG. 4 and do not indicate the accurate positions of the focal points based on the optical arrangement of the composite optical system 20.

According to the embodiment, the orientations of the light paths L1, L2 of the image display light in which the light is reflected at the first principal surface 23 and the second principal surface 24 of the virtual image presentation plate 22 and travels toward the user E are aligned, by providing the display unit 14 at the focal point 26m within the meridional plane of the composite optical system 20. This eliminates the angular difference Δφ between the first light path L1 and the second light path L2 and inhibits the occurrence of double images without using an expensive member like a wedge glass. Accordingly, the virtual image 50 with high visibility is presented by using a simple configuration according to the embodiment.

According to the embodiment, the shift of the display unit 14 from the focal point 26 of the composite optical system 20 causes the viewing distance to the virtual image 50 as viewed from the user E to have a finite value. As a result, the visibility of the scenery seen at a finite distance and the superimposed virtual image 50 is enhanced.

According to the embodiment, by forming the projection optical system 16 with a combination of the convex lens 17 and the concave mirror 18, the concave mirror 18 having a larger radius of curvature can be employed than in the case of forming the projection optical system with a concave mirror alone. By enlarging the radius of curvature of the concave mirror 18 (i.e., by reducing the curvature), double images are eliminated over a wide extent on the virtual image presentation plane so that the virtual image 50 with high visibility is presented. Further, the astigmatism of the projection optical system 16 is reduced and the virtual image 50 with a higher resolution is presented as compared with the case of forming the projection optical system by a concave mirror alone.

The present invention has been described above with reference to the embodiment but is not limited to the embodiment. Appropriate combinations or replacements of the features of the illustrated examples are also encompassed by the present invention.

In the embodiment described above, the display unit 14 is assumed to be provided at the focal point 26m within the meridional plane of the composite optical system 20. The display unit 14 may not be located strictly at the focal point 26m within the meridional plane of the composite optical system 20 but may be positioned in a predetermined range near the focal point 26m within the meridional plane. In this case, the display unit 14 may be positioned between the composite focal point 26 of the composite optical system 20 and the focal point 26m within the meridional plane or positioned nearer the focal point 26m within the meridional plane than the focal point 26s within the sagittal plane. The display unit 14 may be positioned nearer the convex lens 17 than the focal point 26m within the meridional plane. The farther the position of the display unit 14 from the focal point 26m within the meridional plane, the more visible double images are. It is therefore preferred to provide the display unit 14 at, for example, a position sufficiently near the focal point 26m within the meridional plane to prevent the occurrence of double images from being perceived by a person with an eyesight of 1.0.

In the embodiment described above, the convex lens 17 is shown as being provided between the display unit 14 and the concave mirror 18. In one variation, the convex lens 17 may not be provided in the projection optical system 16. Even in this case, the occurrence of double images is inhibited by providing the display unit 14 at or near the focal point within the meridional plane of the composite optical system formed by the concave mirror 18 and the virtual image presentation plate 22.

It should be understood that the invention is not limited to the above-described embodiment but may be modified into various forms on the basis of the spirit of the invention. Additionally, the modifications are included in the scope of the invention.

What is claimed is:

1. A virtual image display device comprising:
   a display unit that generates an image display light by modulating an illumination light; and
   a projection optical system that includes a concave mirror for reflecting the image display light toward a virtual image presentation plate, wherein:
      the display unit is provided at a position nearer a focal point within a meridional plane of a composite optical system formed by the virtual image presentation plate and the projection optical system than a focal point within a sagittal plane of the composite optical system, and
      both the focal point within the meridional plane and the focal point within the sagittal plane of the composite optical system are located away from the concave mirror in a direction from the concave mirror toward the display unit.

2. The virtual image display device according to claim 1, wherein the display unit is provided at the focal point within the meridional plane of the composition optical system.

3. The virtual image display device according to claim 1, wherein
the projection optical system further includes a convex lens provided between the display unit and the concave mirror.

4. The virtual image display device according to claim 1, wherein
the virtual image presentation plate is a windshield provided in a vehicle and having a uniform thickness.

5. The virtual image display device according to claim 1, wherein
the focal point within the sagittal plane of the composite optical system is farther from the concave mirror than the focal point within the meridional plane of the composite optical system.

* * * * *